United States Patent
Keller, III

(10) Patent No.: US 9,562,962 B2
(45) Date of Patent: *Feb. 7, 2017

(54) SYSTEM AND METHOD FOR PHYSICALLY DETECTING, IDENTIFYING, DIAGNOSING AND GEOLOCATING ELECTRONIC DEVICES CONNECTABLE TO A NETWORK

(71) Applicant: Walter J. Keller, III, Bridgeville, PA (US)

(72) Inventor: Walter J. Keller, III, Bridgeville, PA (US)

(73) Assignee: Nokomis, Inc., Charleroi, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,160

(22) Filed: Jul. 11, 2014

(65) Prior Publication Data

US 2015/0009073 A1    Jan. 8, 2015

Related U.S. Application Data

(63) Continuation of application No. 13/344,717, filed on Jan. 6, 2012, now Pat. No. 8,825,823.

(Continued)

(51) Int. Cl.
*G01S 5/02*       (2010.01)
*H04L 12/26*    (2006.01)
(Continued)

(52) U.S. Cl.
CPC .................. *G01S 5/02* (2013.01); *F41A 17/06* (2013.01); *F42D 5/02* (2013.01); *H04L 43/00* (2013.01)

(58) Field of Classification Search
CPC ........................................................ H04L 1/00
(Continued)

(56) References Cited

U.S. PATENT DOCUMENTS 5,218,294 A    6/1993  Soiferman
5,227,800 A    7/1993  Huguenin et al.
(Continued)

FOREIGN PATENT DOCUMENTS

JP        06011530        1/1994
JP      2003503679        1/2003

*Primary Examiner* — Lashonda Jacobs
(74) *Attorney, Agent, or Firm* — James Ray and Assocs; Alexander Pokot

(57) ABSTRACT

An emissions detection apparatus for at least one of detecting, identifying, diagnosing and geolocating an electronic device or an information transmitted from the electronic device includes an emissions collections device connected to an antenna receiving emission of an electromagnetic energy emitted from the electronic device and collecting a spectral data emitted from the electronic device; one or more algorithms processing the collected spectral data, algorithms selected from a group consisting of a peak detection algorithm, a multiple peak detection algorithm, a harmonic correlation algorithm, a non-harmonic correlation algorithm, a time correlation algorithm, a phase correlation algorithm, and a duty cycle timing correlation algorithm; and one or more algorithms matching the processed spectral data to an emissions template, wherein a match of the processed spectral data with the emissions template at least one of detects, identifies, diagnoses and geolocates the electronic device or the information transmitted from the electronic device.

22 Claims, 5 Drawing Sheets

Related U.S. Application Data

(60) Provisional application No. 61/460,676, filed on Jan. 6, 2011.

(51) Int. Cl.
  *F41A 17/06* (2006.01)
  *F42D 5/02* (2006.01)

(58) Field of Classification Search
  USPC .......... 709/223, 224; 342/13, 127, 159, 193, 342/463; 702/187
  See application file for complete search history.

(56) References Cited

U.S. PATENT DOCUMENTS

| | | | |
|---|---|---|---|
| 5,302,830 A | 4/1994 | Shivanandan | |
| 5,424,633 A | 6/1995 | Soiferman | |
| 5,517,110 A | 5/1996 | Soiferman | |
| 5,668,342 A | 9/1997 | Discher | |
| 5,714,888 A | 2/1998 | Naujoks | |
| 6,049,301 A | 4/2000 | Weagant | |
| 6,057,765 A | 5/2000 | Jones et al. | |
| 6,163,259 A | 12/2000 | Barsumian et al. | |
| 6,496,703 B1 | 12/2002 | da Silva | |
| 6,720,905 B2 | 4/2004 | Levitan et al. | |
| 6,759,863 B2 | 7/2004 | Moore | |
| 6,765,527 B2 | 7/2004 | Jablonski et al. | |
| 6,825,456 B2 | 11/2004 | Chadwick et al. | |
| 6,897,777 B2 | 5/2005 | Holmes et al. | |
| 6,927,579 B2 | 8/2005 | Blades | |
| 6,985,771 B2 | 1/2006 | Fischell et al. | |
| 7,130,624 B1 | 10/2006 | Jackson et al. | |
| 7,138,936 B2 | 11/2006 | Duff et al. | |
| 7,188,037 B2 | 3/2007 | Hidehira | |
| 7,391,356 B2 | 6/2008 | Brumley et al. | |
| 7,512,511 B1 | 3/2009 | Schultz et al. | |
| 7,515,094 B2 | 4/2009 | Keller, III | |
| 7,609,199 B2 | 10/2009 | Nishijima et al. | |
| 7,639,178 B1 | 12/2009 | Mulbrook et al. | |
| 7,646,005 B2 * | 1/2010 | Chase | F23M 11/045 250/227.26 |
| 7,777,671 B2 | 8/2010 | Schnitzer et al. | |
| 7,777,672 B2 | 8/2010 | Schnitzer et al. | |
| 7,844,341 B2 | 11/2010 | Von Arx et al. | |
| 7,853,437 B2 * | 12/2010 | Seguin | G01S 7/021 342/463 |
| 8,063,813 B1 | 11/2011 | Keller | |
| 8,069,490 B2 * | 11/2011 | Gross | G01R 31/2813 726/34 |
| 2005/0265124 A1 | 12/2005 | Smith | |
| 2006/0152232 A1 | 7/2006 | Shvets et al. | |
| 2007/0027643 A1 | 2/2007 | Lesesky et al. | |
| 2007/0279071 A1 * | 12/2007 | Orton | G01R 31/083 324/523 |
| 2008/0103555 A1 | 5/2008 | Dicks et al. | |
| 2009/0216498 A1 * | 8/2009 | Seguin | G01S 7/021 702/189 |
| 2010/0123453 A1 | 5/2010 | Pauly et al. | |
| 2010/0125438 A1 | 5/2010 | Audet | |
| 2010/0315295 A1 * | 12/2010 | Tucek | H01Q 1/36 343/700 MS |
| 2011/0210829 A1 * | 9/2011 | Kean | G06F 21/76 340/10.42 |
| 2011/0313651 A1 * | 12/2011 | Hyde | G08B 3/10 701/400 |
| 2011/0320170 A1 | 12/2011 | Pathak et al. | |
| 2012/0179812 A1 * | 7/2012 | Keller, III | F24D 5/02 709/224 |
| 2012/0223403 A1 | 9/2012 | Keller, III et al. | |
| 2012/0226463 A1 | 9/2012 | Keller, III et al. | |

* cited by examiner

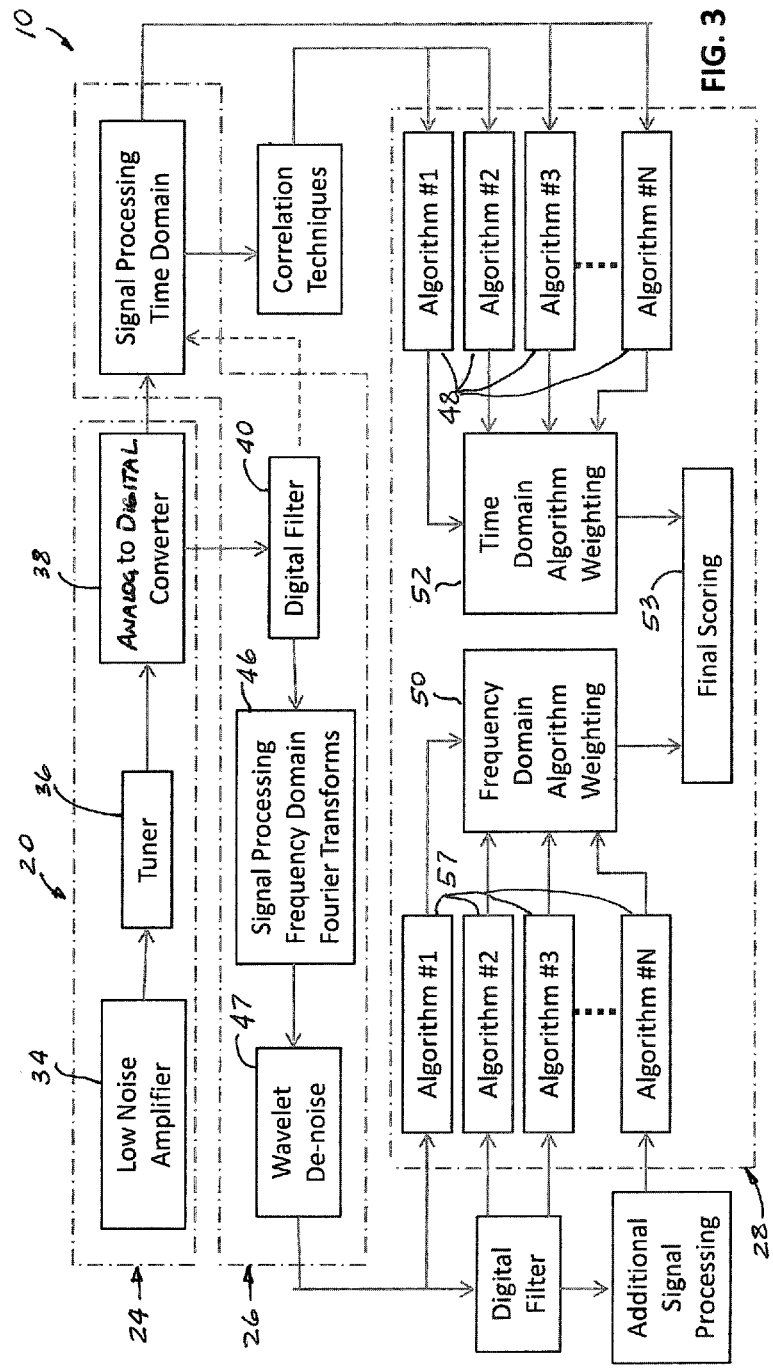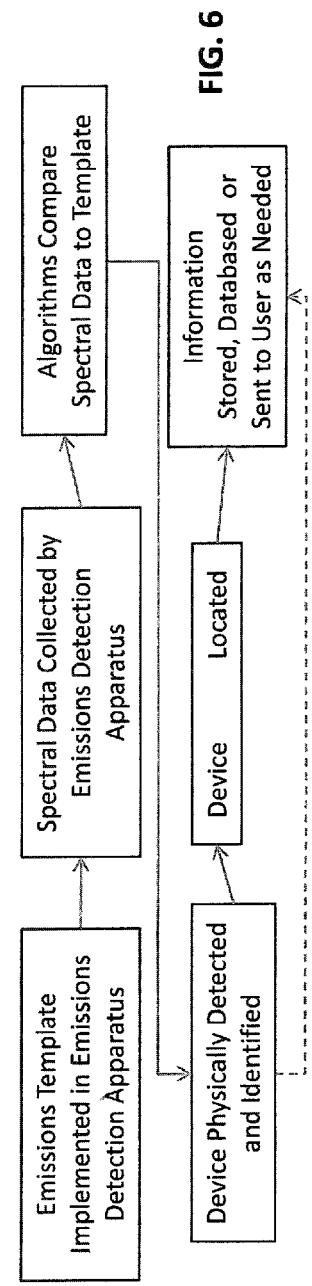

SYSTEM AND METHOD FOR PHYSICALLY DETECTING, IDENTIFYING, DIAGNOSING AND GEOLOCATING ELECTRONIC DEVICES CONNECTABLE TO A NETWORK

CROSS REFERENCE TO RELATED APPLICATION

This patent application is a Continuation of U.S. patent application Ser. No. 13/344,717 filed Jan. 6, 2012 issued as U.S. Pat. No. 8,825,823 B2 on Sep. 2, 2014. This patent application is related to and claims priority from U.S. Provisional Patent Application Ser. No. 61/460,676 filed Jan. 6, 2011 and being incorporated into this document by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

FIELD OF THE INVENTION

The present invention relates, in general, to a system and method for detecting, identifying, diagnosing and geolocating electronic devices that are connected to a network through the use of data collected relating to the device via the network and, more particularly, this invention relates to a method of and a system for identifying not only the device connected to the network, but also devices located in the immediate vicinity of the device that is connected to the network using the intended or unintended emissions given off by the described devices.

BACKGROUND OF THE INVENTION

As is generally known, it is often necessary to physically detect, identify and geolocate devices and/or users of such devices or perform diagnostics on the devices. Of a particular interest are electronic devices connected to a network. In one example, product sales and marketing organizations rely on the internet for tracking interests of the user in order to select specific group of users for targeted marketing campaigns so as to maximize profits. In another example, product manufactures use networks to assure timing, coordination and status of all the machines and robots necessary to manufacture products on a manufacturing line. In yet another example, law enforcement relies on the information sent over the network so as to detect illegal activities and facilitate termination of such illegal activities.

The electronic device can be connected to the network using a large number of technologies and approaches that include hard wiring, wireless, infrared and optical means as examples. Due to the nature of network connections and communications, the electronic device will provide specific information regarding itself that is transmitted over the network to other devices on the network. Some of this information is intended to be transmitted and some of it is unintentionally transmitted over the network. A well known example of intended information that is sent over the network, such as Internet, is an Internet Protocol (IP) address for internet communications or a password to access an account on an organizations intranet. Nonetheless, significant information is transmitted from the device over the network during any information transfer over a network. In some applications this media has been referred to as cyberspace. For instance the device may not only send out, as noted above, the IP address and passwords that identify the user of the device, but also send out other identifying information about the device that is attached to the network that can be used to differentiate the individual device from other devices connected to the network. Examples of general information that is sent includes, but is not limited to connection speeds, modem speeds, fonts, clock speeds, processor speeds, device types, hardware configurations, software configurations and in the case of wireless devices the frequency of transmission of the device or computer that are intentionally sent across cyberspace. Furthermore, there are specific sets of commanded information that can be sent such as passwords, status, software configurations, health of systems present and user identifiers of many kinds. In addition to intended information, there is significant unintended information being transmitted over the network that is not intended to be sent across the connection but that is inevitably sent.

Furthermore, any physical electrical or electronic device that is powered will give off unintended emissions. Specifications, such as FCC Part 15, FCC Part 18CISPR 11, CISPR 14-1, CISPR 22, ICES-003 and MIL-STD-461 are intended to govern the amount of unintended emissions that are given off by a commercially sold device to prevent device to device Electromagnetic Interference (EMI) and assure Electromagnetic Compatibility (EMC). Nonetheless, even devices that meet the statutory requirements give off unintended emissions. Each and every physical component that makes up an electronic device contributes directly or indirectly to the characteristics of the unintended emissions that are given off by the electrical or electronic device.

However, prior to conceptualization and design of the instant invention, difficulties exist in physically locating devices connected to the network, particularly by way of a wireless connection or by way of a masked hardwired connection. Further difficulties exist and, to the best of Applicant's knowledge, no other methods are available for identifying other electronic devices located in a proximity to the device connected to the network. Additional difficulties exist in locating devices that have been previously connected to the network.

Therefore, there is a need for an improved system and method for detecting, identifying, diagnosing and geolocating electronic devices that are connected or have been connected to a network and electronic devices that are located in proximity to the device connected to the network.

SUMMARY OF THE INVENTION

The present invention provides an apparatus and method of detecting, locating, and geolocating electronic devices, that have at one time been connected to a network. This invention includes an emission detection apparatus and a means for collecting information on a network about devices that are connected to the network. The network information collection component could be any network collection means known in the art, for example data mining, directly transmitted information collection, digital fingerprinting, deep packet inspection, cookies, tracking software and indirectly transmitted information collection could be employed.

In one embodiment, the invention is specifically configured to provide marketing information for targeted electronics to understand the user's product preferences.

In the case of electronic device status monitoring, network sent data can provide status monitoring of the health of equipment and electronics. The invention directly uses this information as network collected data to enhance status monitoring of systems and health monitoring of systems as well as provides a mechanism to predict the health of the electronics that make up a system.

OBJECTS OF THE INVENTION

It is, therefore, one of the primary objects of the present invention to provide a system that uses data derived from a network for locating electronic devices.

Another object of the present invention is to provide a system for providing diagnostics of the electronic device that is identified using data derived from a network the electronic device is connected to.

Still another object of the present invention is to provide a system for identifying by make, model and other distinguishing features the electronic device that is identified using data derived from a network the electronic device is connected to.

Still another object of the present invention is to provide a system for providing the location on a map or other suitable medium using identified geospatial coordinate of the electronic device that is identified using data derived from a network the electronic device is connected to.

Still another object of the present invention is to provide a system for providing the location of the electronic device inside a structure using data derived from a network the electronic device is connected to.

Still another object of the present invention is to provide a system for identifying other electronic devices in the vicinity of the electronic device that was detected using data derived from a network the electronic device is connected to.

Yet another object of the present invention is to provide device system that provides at least one of detection, identification, geolocation, and diagnostics of electronics in the vicinity of the electronic device that was detected using network data collection techniques.

Yet another object of the present invention is to provide system that provides at least one of detection, identification, geolocation, and diagnostics of electronics and that further incorporates a database of electronic templates and signatures.

Yet another object of the present invention is to provide system that provides at least one of detection, identification, geolocation, and diagnostics of electronics that further incorporates a database of all electronics detected and that provides at least one of device detailed identification, geolocation and relationship with other devices in the vicinity.

Yet another object of the present invention is to develop the database for sale to organizations for marketing purposes.

Yet another object of the present invention is to combine the data in the database with other data collected online about the device to develop a more robust database for sale for marketing purposes.

An additional object of the present invention is to provide a system that can be used to diagnose problems with devices connected to a network.

Another object of the present invention is to provide a system that can be used to diagnose problems with subcomponents of the devices connected to a network.

Yet another object of the present invention is to provide a system that can be used to diagnose problems with circuits that are contained in subcomponents of the devices connected to a network.

A further object of the present invention is to provide a system that can be used to diagnose problems with electronic parts that are part of circuits that are contained in subcomponents of the devices connected to a network.

Yet a further object of the present invention is to provide a system that can be used to diagnose problems with semi-conductor type electronic parts that are part of circuits that are contained in subcomponents of the devices connected to a network.

An additional object of the present invention is to provide a system that can be used to diagnose problems with devices connected to a network so that corrective action may be taken against those devices using the network that the device is connected to once the problem with the electronic detected to the network is identified.

Another object of the present invention is to provide a system that can be used for health monitoring of electronics that are connected to the network.

Another object of the present invention is to provide a system for health monitoring of a device connected to the network that incorporates both self assessment of device health via network transmissions from the device as well as sensed health from the analysis of unintended emissions given off by the same device.

Yet another object of the present invention is to provide a system that can be used for status monitoring of a network and at least one of real time detection of anomalies and prediction of anomalies.

A further object of the present invention is to provide a system that can be used to verify that corrective action has been effectively taken against a device connected to the network.

Yet a further object of the present invention is to provide a system that uses multiple parallel algorithms to improve the confidence in identifying the different emission characteristics of the specific electronic device being detected.

An additional object of the present invention is to provide a system that uses at least one of multiple receivers and multiple network collection devices to improve the confidence in identifying the electronics health status in a manufacturing environment.

Yet another object of the present invention is to provide a system using RF emission detection device that is networked with other RF emission detection devices for enhanced measurement over a larger geographical area.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIG. 3 is a schematic block diagram of the system of FIG. 1, particularly illustrating the apparatus for detecting emissions;

FIG. 6 is another flow chart of the method for at least one of detecting, identifying, diagnosing anomalies in and geolocating at least one device connectable to a network.

DESCRIPTION OF THE VARIOUS EMBODIMENTS OF THE INVENTION

Figure 1:
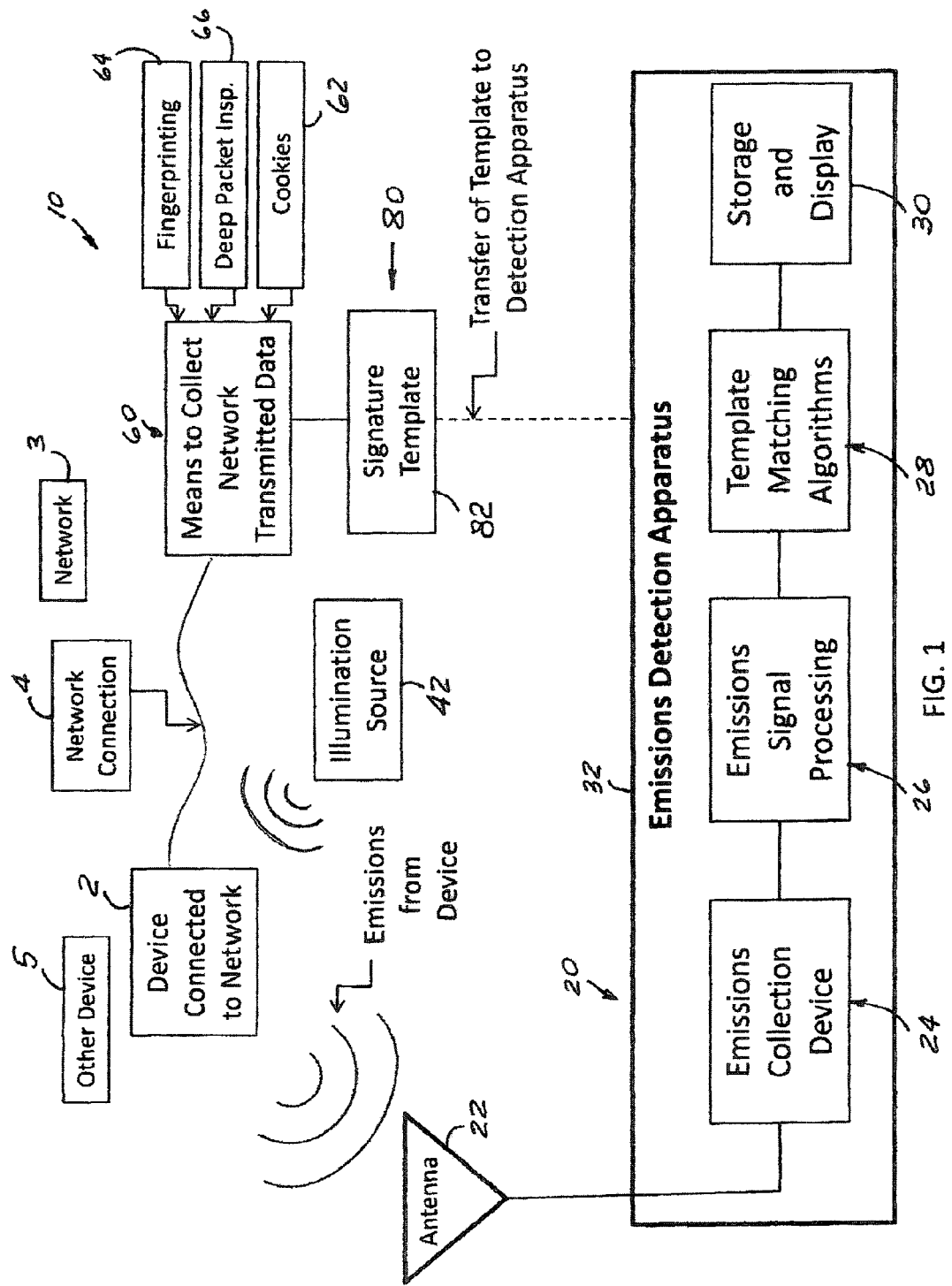
FIG. 1 is a schematic block diagram of a system for at least one of detecting, identifying, diagnosing anomalies in and geolocating at least one device connectable to a network.

Prior to proceeding to the more detailed description of the present invention it should be noted that, for the sake of clarity and understanding, identical components which have identical functions have been identified with identical reference numerals throughout the several views illustrated in the drawing figures.

Now in reference to FIGS. 1-4, therein is illustrated a system, generally designated as 10, for at least one of detecting, identifying, diagnosing anomalies in and geolocating at least one device 2. The instant invention is illustrated and described in combination with an electronic device 2, including but not limited to desktop computers, laptops, mobile communication devices, mobile computing devices, personal data assistants, workstations, tablets, pads and the like devices. Term "electronic" is to be understood in this document as a device that contains at least one electronic component giving off intended or unintended emissions.

The electronic device 2 is connectable to a network 3 by way of a network connection 4 originating from communication ports or physical interfaces of the device 2. The electronic device 2 can be connected to the network 3 using a large number of technologies and approaches. Thus, the network connection 4 includes but is not limited to hard wiring, wireless, infrared and optical means.

The most common network 3 that may be utilized is the internet or the worldwide web though closed company networks, educational networks, non-profit networks or government networks and a myriad of other networks can be used.

The system 10 may also include such network 3, wherein the network 3 is one of an internet, an intranet, a Global System for Mobile communications, a Code Division Multiple Access, and a Time Division Multiple Access.

Figure 2:
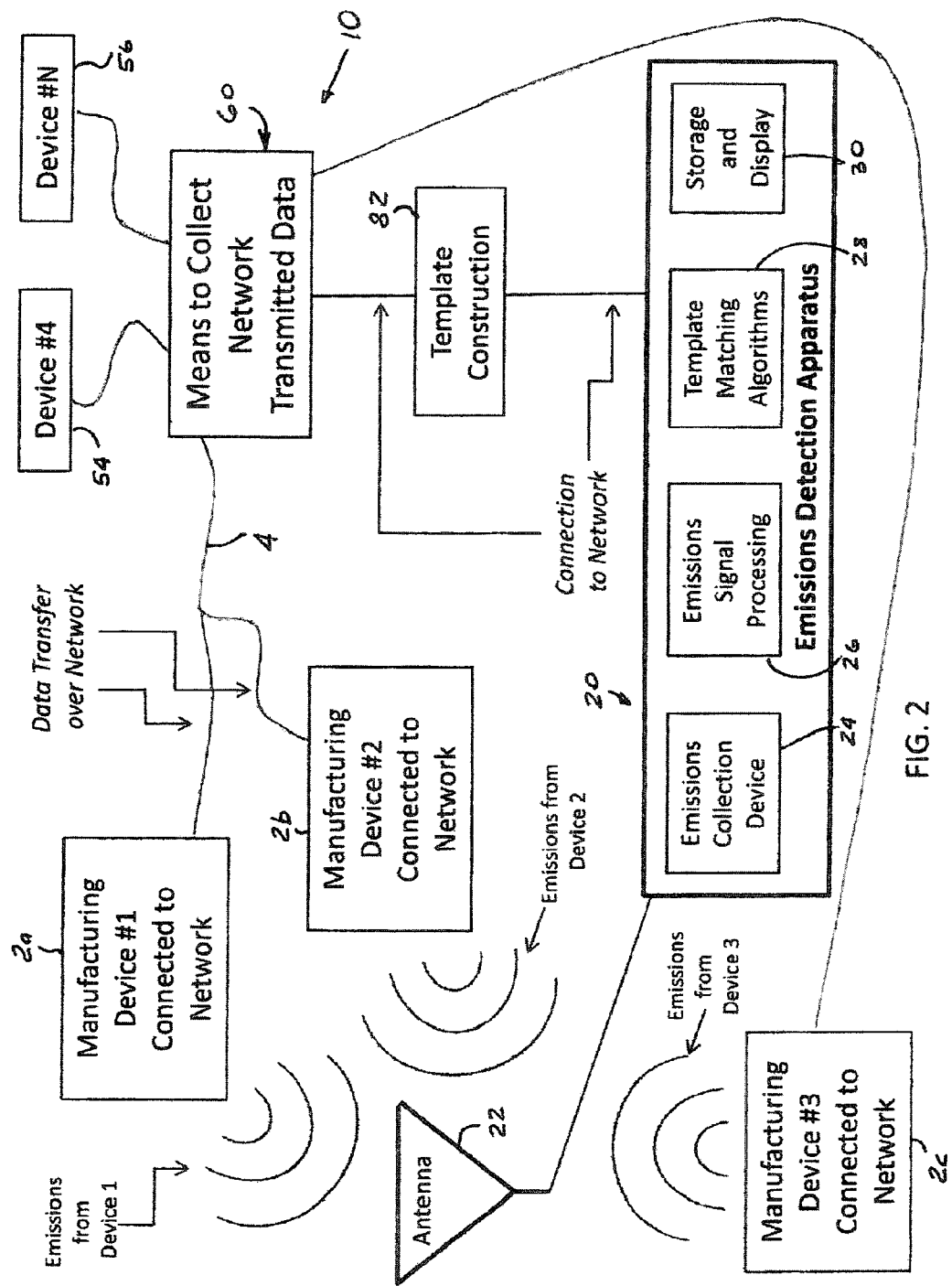
FIG. 2 is a schematic block diagram of the system of FIG. 1, particularly illustrating a plurality of manufacturing devices connected to the network.

In a particular reference to FIG. 2, the instant invention contemplates that plurality of devices 2 are networked together, for example at a manufacturing facility. However, the embodiment of FIG. 2 is applicable to other environments, such as a company, educational institution, government organization, manufacturing line and the like where a number of devices may be connected to a network 3. In this case the devices 2a-2c may send similar information over a network 3 that may be closed (not connected to the outside world) or open (connected to the outside world). In this case the information can be used to detect devices 2a-2c connected to the network 3 and provide status monitoring of the devices 2.

The electronic device 2 transmits over such network connection 4 a set of parameters identifying the device 2 as well as other information based on interests or needs of the user of the electronic device 2, which is referred to in this document as intended information. This intended information includes but is not limited to Internet Protocol (IP) address, connection speeds, modem speeds, fonts, clock speeds, processor speeds, device types, hardware configurations, software configurations and in the case of wireless devices the frequency of transmission of the device or computer that are intentionally sent across cyberspace. Furthermore, there are specific sets of commanded information that can be sent such as passwords, status, software configurations, health of systems present and user identifiers of many kinds.

In addition to the intended information, there is significant unintended information being inevitably transmitted over the network connection 4 when the electronic device 2 is connected thereto.

In some cases the at least one device 2 may transmit it's physical location over the network directly or indirectly, but even if that information is not transmitted directly, the identification and location of the device that has transmitted the information over the network can be found by reconstructing the characteristics of the device using network collected data to form an anticipated emissions signature that can be detected by the emission detection apparatus 20 described further in this document.

The electronic device 2, as is any physical electrical or electronic device that is powered, further generates and gives off intended and unintended emissions.

The intended emissions are related to specific operating transmission of the at least one device 2, while unintended emissions are inherent products of any operating electronic component or device.

Unintended emissions can also be prompted to be given off by electronic components or devices by an illumination source 42, to be discussed further in this document, even when they are not operating.

The instant invention takes advantage of the fact that not only these emissions can be detected, but the emissions are characteristic depending on the make-up and configuration of the at least one device 2 that is creating the emissions.

Components that give off emissions in an accidental or unintended manner include but not limited to clocks, processors, microcontrollers, power supplies, power converters, oscillators, resonators, integrated circuits that make up electrical and electronic devices. Characteristic information about these same components is also sent directly or indirectly in networked applications or cyberspace through the network connection 4.

Thus, the forgoing description will be focused on emission of electromagnetic energy and, more particularly, the emission of electromagnetic energy being in a Radio Frequency (RF) spectrum, which is typically referred to in the art as frequencies below 300 GHZ, although sound and odor emissions to include ultrasonic and infrasonic emissions are also contemplated by the instant invention.

System 10 of the presently preferred embodiment contains three essential elements.

The first essential element of the system 10 is a first means or emissions detection apparatus, generally designated as 20, which, in accordance with a presently preferred embodiment, is provided for at least one of sensing, processing, algorithmically matching, storing and displaying at least one emission of the electromagnetic energy for at least one of detecting, identifying, diagnosing and geolocating the at least the electronic device.

The second essential element of the system 10 is a second means or network data collection apparatus, generally designated as 60, for collecting a set of parameters transmitted through a network by at least one device connectable thereto.

The third essential element of the system 10 is a third means, generally designated as 80, for at least one of generating and providing the necessary signature, signature template, and associated parameters for at least one of detecting, identifying, diagnosing and geolocating the at least the device connectable to the network.

The first means 20 includes an antenna 22, an emission collection device or receiver 24 coupled to the antenna 22 and configured to output an emission signal.

The detailed description and operation of the emission collection device or receiver 24 are best shown and described in U.S. Pat. No. 7,515,094 and in U.S. Pat. No. 8,063,813, both issued to Keller, III and in the U.S. patent application Ser. No. 12/551,635 filed on Sep. 1, 2009 and entitled "ADVANCE MANUFACTURING MONITORING AND DIAGNOSTIC TOOL", U.S. patent application Ser. No. 13/106,412 filed on May 12, 2011 and entitled "METHOD AND APPARATUS FOR THE DIAGNOSIS AND PROGNOSIS OF ACTIVE IMPLANTS IN OR ATTACHED TO BIOLOGICAL HOSTS OR SYSTEMS" and in U.S. patent application Ser. No. 12/911,072 filed on Oct. 25, 2010 and entitled "IDENTIFICATION AND ANALYSIS OF SOURCE EMISSIONS THROUGH HARMONIC PHASE COMPARISON", all owned by the assignee of the instant invention and whose teachings are incorporated into this document by reference thereto. Thus, the detail description and operation of the emission collection device or receiver 24 is omitted herein for the sake of brevity.

Briefly, in further reference to FIG. 3, the emission collection device or receiver 24 has at least one receiver channel and at least includes a low noise amplifier 34, a tuner 36, and an analog to digital converter 38. Preferably, the emission collection device or receiver 24 is configured to sense the at least one emission through at least one wall of a structure though the emissions collection device can be used in open air where no such wall exists.

The first means 20 may be operated in a passive mode wherein the receiver 24 collects the radiated emissions from the at least one device 2 or the first means 20 may be operated in active mode being adapted with an electromagnetic source 42 for illuminating the at least one device 2 so as to enhance emissions radiated thereof or cause the emissions to be given off. The electromagnetic source 42 could be any electromagnetic emitter known in the art, for example a narrowband source such as a klystron or magnetron or an adjustable wideband electromagnetic emitter.

Thus, in passive mode a high sensitivity receiver 24 would search for electronics devices 2 without illumination from an electromagnetic source 42. In active mode a high sensitivity receiver 24 would search for electronic devices with illumination from an electromagnetic source 42. Detection can be enhanced by correlating the received emissions from the electronic device 2 in active and passive modes. Further correlation can be achieved via positive feedback to the network collection apparatus for both active and passive collection.

The receiver 24 may be operable in an automated manner. Preferably the automatic operation of the receiver 24 is implemented through software executing a predetermined logic, but a hardware solution could also be implemented. The automatic operation of the receiver 24 is the presently preferred embodiment the emissions detection apparatus 20. The emissions detection apparatus 20 may be also configured in an unattended sensor operation mode capable of automatically detecting electronic devices 2 in a wide variety of conditions to minimize the integration and training required of the users. The information collected is then communicated to other networked devices and either a central or distributed database.

Unintended radiated emission data from the at least one target device 2 are measured and recorded over a range of operating modes, conditions and environments to ensure the capture of all the signature variations.

At least the emissions detection apparatus 20 may be mounted on a vehicle 32 being either stationary of movable. When a moving vehicle 32 comes in proximity to the electronic device 2 of interest, the receiver 24 measures the emissions and may be also configured to locate the physical location of the at least one device 2 as well as other electronics in the vicinity of the device 2. The vehicle 32 may be either ground engaging or operating in space, on a surface of a body of water or within the surface of the body of water. It is also to be understood that definition of the vehicle herein includes stationary structures, such as a platform, a tower and the like structures and other structures, for example such as a robotic device.

First means 20 also includes means 26 for processing the emissions signal that include a digital filter 40, means 44 for processing the signal in a time domain and means 46 for processing the signal in a frequency domain independently from the means 44 for processing the signal in the time domain. Each of these means 44, 46 for processing the signal provide a methodology for determining different characteristics of an emissions signature. When the time domain manifestation of the emission signal data and the frequency domain manifestation of the emission signal data are processed independently and then further algorithms are applied to each respective data stream independently substantial improvement in device detection, identification and geolocation can be established. Further improvement still can be made by adding other transform domains that are advantageous for extraction of device signature characteristics, such as Laplace transform and convolution techniques.

The means 26 for processing the emission signal after collection is operable to generate, for algorithm matching purposes, signature components of the at least one emission.

Means 26 may also include means 47 for reducing noise of the emission signal processed in the frequency domain 46.

In the presently preferred embodiment, the first means 20 additionally include means 28 for matching the processed emission signal against a template 82 of emission signature(s) in accordance with a predetermined logic, although the instant invention contemplates that the means 28 may be provided in combination with the template 82 within the third means 80.

Means 28 includes at least one and preferably a plurality of time domain signature matching algorithms 48. Thus, the means 44 for processing the emissions signal in the time domain is configured to prepare the signal for characteristic extraction via the execution of a plurality of time domain signature matching algorithms 48. The predetermined logic includes at least two algorithms 48 operating in parallel to each other. The parallel operation of the at least two algorithms 48 is preferred for computational speed, although serial operation is also contemplated.

Such predetermined logic may include at least two orthogonal algorithms. There is no limit to the number of algorithms that can be employed in parallel. Greater number of parallel algorithms that look at independent characteristic improve ability to locate, identify, diagnose and geolocate the at least one device 2.

Orthogonal algorithms are defined as algorithms intended to process uncorrelated independent characteristics. Preferably, each of the algorithms 48 operating in parallel to each other processes and independent characteristic of the at least one device 2.

Means 28 also includes at least one and preferably a plurality of frequency domain signature matching algorithms 57. Thus, the means 46 for processing the emissions signal in the frequency domain is preferably configured to prepare the signal for characteristic extraction via the execution a plurality of frequency domain signature matching algorithms 57. The predetermined logic includes at least two algorithms 57 operating in parallel to each other. Such predetermined logic may include at least two orthogonal algorithms. Preferably, each of the algorithms 57 operating in parallel to each other processes and independent characteristic of the at least one device 2.

Means 28 additionally includes means for weighting output of each of the least two algorithms so as to enhance probability of detection of the at least one device 2. The invention contemplates means 50 for weighting output of each of the least two algorithms 57 and an independent means 52 for weighting output of each of the least two algorithms 48. Such means 50, 52 includes at least one other algorithm.

Means 28 finally includes means for outputting a final score (value) 53 of analyzed signature components of the emission collected by the emission collection device 24. The final scoring means 53 combines the weighting of means 50 and means 52 to derive a final score based on the architecture described. The invention also provides that the predetermined logic includes at least one algorithm that operates based on at least one of physically collected data and network constructed data.

The final score is compared within means 28 against a threshold defined by a probability of a detection of the at least one device 2. Thus, the final score derived from at least one of the time domain processing, the frequency domain processing, a plurality of time domain algorithms and a plurality of frequency domain algorithms is combined to enhance overall scoring for the detection, identification and geolocation of electronics.

The scoring uses advanced algorithms that assess how well each algorithm has matched the signature template 82 and then how well the entire cadre of algorithms has matched the signature template 82 in aggregate. As stated, each algorithm focuses on a different aspect or characteristic of the signature. Each device will also have different weightings to each algorithm in the scoring so that it is possible to better match the strongest criteria of any given device since some devices may not present some characteristics as strongly.

Final scoring 53 provides, as an output, a numerical score. Above a certain threshold, the numerical score defines detection or verification that is displayed or saved as applicable. The thresholds are defined by the probability of detection that is admissible by a particular application or user.

Physically the algorithms 48, 52 are employed on FPGAs where speed and throughput is critical or on DSP chips or power PC chips where it is beneficial to have recursive matching algorithms. Where the most demanding recursive number crunching is needed, a dual core single board computer is used.

Through the use of at least one of algorithms 48 and algorithms 52, the system 10 automatically matches processed spectral data derived from at least one of collected emissions with predetermined emission signature to a specific device 2 or a constructed template 82 from the construction of networked derived data to include the identification of the make or model of the device 2, thereby providing a mechanism to detect and identify such device 2. The receiver 24 is so designed that its sensitivity is sufficient to detect emissions at a range from the at least one device 2 and further over a broad geographical area or range. Through the use of additional algorithms dedicated to not only finding the at least one device 2, but to locating it as well, the at least one device 2 can be further geolocated based on the intended or unintended emissions that are given off.

Baseband demodulation, decimation, filtering, Fourier Transforms, Wavelet Transforms 47, Artificial Intelligence (AI), Artificial Neural Networks (ANN), detection and signal identification algorithms and reconfigurable hardware (FPGA) topologies implementing advanced processing are contemplated for use in the instant invention.

The first means 20 of the presently preferred embodiment also includes a data storage 30 that contains parameters from at least one device 2 and/or from at least one other device 5 of interest that can be located in a vicinity of the at least one device 2.

The data storage can 30 at least one of store, display hierarchically and catalog an arbitrary number of devices 26.

The data storage 30 includes a library of signatures identifying the at least one device 2 and at least one other device 5 and wherein the signatures were generated from at least one of the first and second means, 20 and 60 respectively.

As has been described above, the emission detection means 20 is configured to sense emissions from at least one other device 5 located in close proximity to the at least one device 2. Accordingly, the emission detection means 20 may further have means for identifying the at least one other device 5 that are either disposed within or external thereto. For example, other devices 5 located in proximity to the at least one device 2 may include televisions, refrigerators, ovens, dishwashers, washers, printers, monitors and the like devices employing electronic components or sub-assemblies for their operation. As has been established above, any electronic components or sub-assembly gives off intended and/or unintended emissions. Such emissions are then processed and analyzed to determine/define a collection of the other devices 5. This information may be valuable for example, to sales and marketing organizations of such other devices 5 enabling them to stream a preselected information to the at least one device 2 connected to the network 3 by way of the network confection 4, wherein the preselected information is dependent on a type of the at least one other device 5 identified by the system 10. The system 10 is also configured to enhance information about a user of the at least one device 2 based on a type of the at least one other identified device 5.

As it has been further established above, the instant invention allows the at least one device 2 being a plurality of devices and wherein the first means 20 is configured to at least sense emissions from the plurality of devices 2. At least some of the plurality of devices may be connected to the network 3 when the first means 20 is operable to sense the emissions. The instant invention also contemplates that all of the plurality of devices were connected to the network 3 prior to the first means 20 being operable to sense the radiated emissions.

The emission detection apparatus 20 may function without the active automatic detection mode or without the passive automatic detection mode.

In further reference to FIG. 2, by way of an example only, the system 10 is configured to detect a device or a component of the device employed in a manufacturing environment. Particularly, FIG. 2 illustrates a manufacturing devices 2a-2c, each having a connection to the network 3. The system 10 of FIG. 2, may be also configured to include at least one health monitoring device 54 and wherein the first means 20 is configured to interface with the at least one health monitoring device so as to enhance at least one of health monitoring and status monitoring of electronic devices 2a-2c. The system 10 may further be utilized to not only utilize the network derived health monitoring information transmitted by the health monitoring device, but also measure using the emissions from the health monitoring device 54 to determine the state of operation and health of the health monitoring device itself. Thus, the system 10 is configured to perform diagnostics and/or is configured to detect a device 2a, 2b or 2c that is at least one of beginning to display signs of degradation and show signs of imminent failure. The system 10 of FIG. 2 may also be contemplated to include at least one backup device 56 and wherein the first means 20 is configured to interface with the at least one back up device 56 so as to facilitate prompt switchover of operation thereto. Advantageously, the devices 54 and 56 may be also monitored by the system 10.

It is presently preferred that the first means or emission detection apparatus 20 including the emission collection device 24, emission signal processing means 26, template matching algorithms 28 and data storage and display 30 is provided as a turnkey apparatus.

Thus, in one embodiment, the emission detection apparatus 20 is a microwave measurement device configured as a turnkey system. In still another embodiment, the emission detection apparatus 20 is a millimeter measurement device configured as a turnkey system. In still another embodiment, the emission detection apparatus 20 is a measurement device operating in the KHz range configured as a turnkey system. In still another embodiment, the emission detection apparatus 20 is an ultrasonic measurement device configured as a turnkey system. In still another embodiment, the emission detection apparatus 20 is an infrasonic measurement device configured as a turnkey system. In yet another embodiment, the emission detection apparatus 20 operates in a passive automated detection mode. In still yet another embodiment, the emission collection device 20 operates in a passive automated detection mode for the detection of at least two devices. In still yet another embodiment, the emission detection apparatus 20 is used to perform diagnostics on any device that is connected to the network.

In another embodiment, the emission detection apparatus 20 is an unattended sensor. In yet still another embodiment, the emission collection device or receiver 20 is used to detect a device 2 through at least one wall. In still another embodiment the emission collection device 20 is used to detect a device 2 in a building through at least two walls. In yet another embodiment, the emission detection apparatus 20 is used to detect a computing device. In still another embodiment the emission detection apparatus 20 is used as a manufacturing screening device to determine if components on a manufacturing line meet a required specification.

In still another embodiment, the emission collection device or receiver 20 is an RF emissions measurement device that operates in a passive automated detection mode. In yet another embodiment, the emission detection apparatus 20 operates in an active automated detection mode. In still another embodiment, the emission detection apparatus 20 operates in an automated detection mode and a passive automated detection mode with correlation between data collected on the network and automated detection mode and the passive automated detection mode. In yet another embodiment, the emission detection apparatus 20 operates in an automated detection mode using the network data and physically collected data and a passive automated detection mode that controls the physical receiver 20 with correlation between the network detection mode and the passive automated detection mode for detection of at least two targets. In still another embodiment, the emission detection apparatus 20 is a broadband frequency agile system that provides real time data back to the network such that the network can probe the device for additional data. In yet another embodiment, the emission measurement device uses information provided by the user of the electronic device directly about the electronic device as opposed to through a network operation. In still another embodiment, the emission detection apparatus 20 is positioned on a vehicle 32 and quantifies and qualifies the electronics that reside on a physical space and further generates a database of the location and physical attributes of the devices. In still another embodiment the emission detection apparatus 20 is integrated onto at least one of a small unmanned aerial vehicle or small robot. In still another embodiment the emission detection apparatus is hand carried. In still another embodiment, the emission measurement device is used to perform diagnostics. In yet another embodiment, the emission detection apparatus 20 is positioned on a first platform and continuously monitors the emissions; the network collection device is positioned in a location where it can collect network data, the two are interfaced for at least one of real time detection, identification, location and diagnostics of electronic devices. In yet still another embodiment, an electromagnetic source 42 is a tunable frequency agile source integrated to create responses that are detected on the network and by the emissions measurement device.

The second means 60 for collecting a set of parameters transmitted through a network 3 by at least one device 2 connectable thereto may be a well known computer, wherein the system 10 includes a connection between the computer and the network and wherein the computer is configured to provide automated identification of the at least one device 2. There are various software and hardware options in the art that can be used to collect information from devices that are connected to the internet. The second means 60 may also include at least one of at least one cookie 62, a digital fingerprinting 64 and a deep packet inspection 66, which are examples of software devices that operate on networks to collect information about network users. The second means 60 may also include a predetermined logic configured to detect physical characteristics of the at least one device 2 connected to the network 3 by way of the network connection 4.

There are several identifying parameters that can be collected about the at least one device 2 that is attached to the network 3. For example, online device fingerprinting 64 has the ability to identify the online characteristics of such at least one device 2. Information that is routinely gathered includes information that is related to the physical characteristics of the device attached to the network. This information may include clock speeds, fonts used, processor information, modem speeds, information packet protocols, usage of the user to include activities online such as sites visited, which form a pattern. These patterns can be tracked online.

Finally, the third means 80 for at least one of developing, generating, storing and transmitting a signature template for at least one of detecting, identifying, diagnosing and geolocating the at least the device 2 connectable to the network 3 may include a pair of signatures, one of the pair of signatures defining the anticipated at least one emission collected by the emission collection device 24 to detect a specific target and based on the pair of signatures defining the set of parameters obtained by the second means 60.

Figure 4:
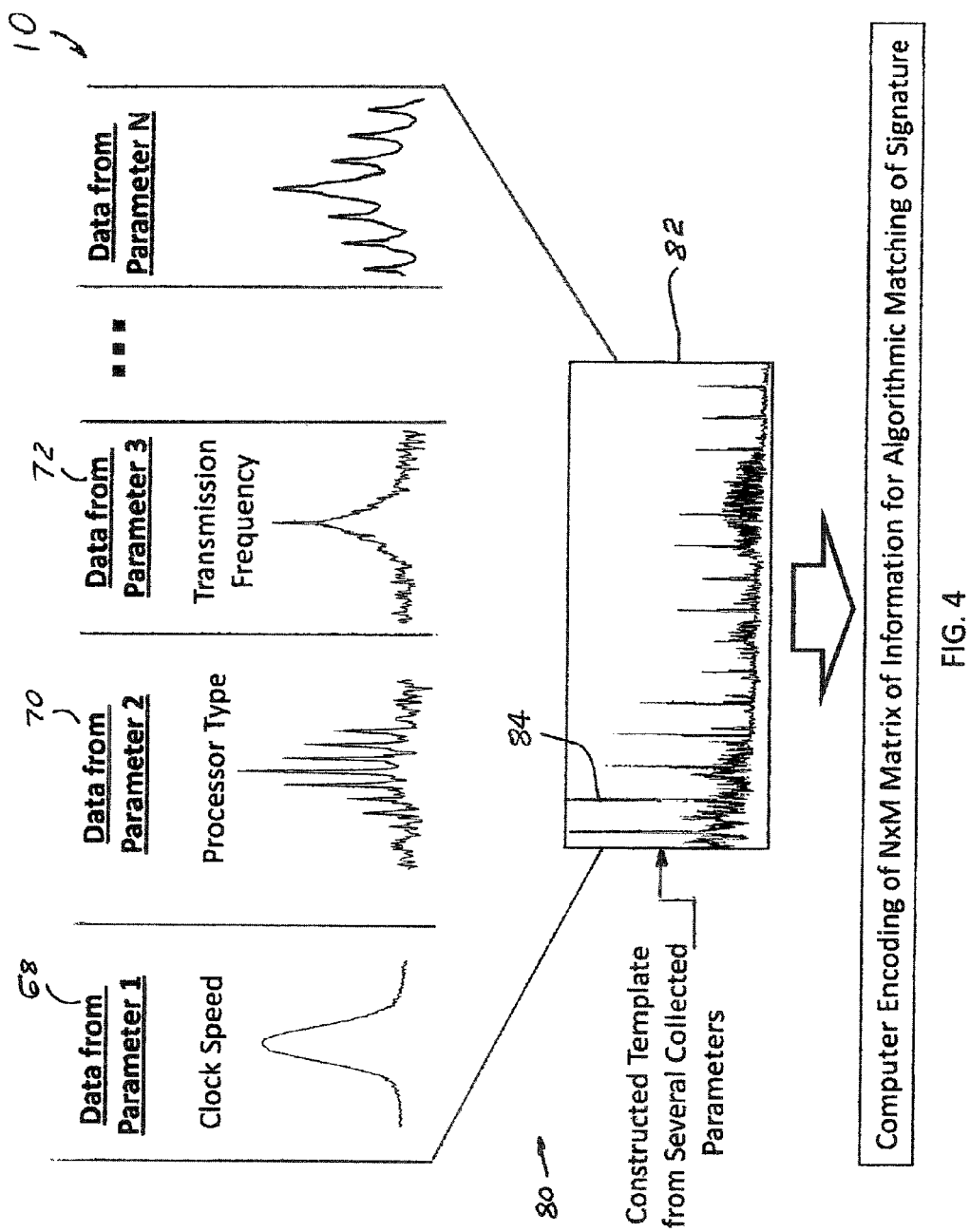
FIG. 4 is a schematic block diagram of the system of FIG. 1, particularly illustrating signature template construction of the at least one device.

Now in reference to FIG. 4, the third means 80, in accordance with one embodiment, includes a signature template 82 of the at least one device 2. The third means 80 may also preferably include at least one of the means to define the parameters necessary for a signature template 82, the means to generate a signature template 82, and the means to store the signature template 82. The third means 80 uses at least one of network generated and physically collected information for the development of the signature template. The instant invention takes advantage of the information sent over the network connection 4 about the at least one device 2 connected to the network 3 in both intended and unintended ways and the information provided can be used to determine physical characteristics ultimately the network derived information can be used to create templates that can be used in the physical world to physically detect, identify and geolocate a device that is attached to a network 3 based solely on the information gathered about that device on the internet. Thus, the signature template 82 includes at least some of the parameters from the set of parameters collected from the network connection 4. In further reference to FIG. 4, the set of parameters includes at least one of a clock speed 68, a processor type 70, and a transmission frequency 72, and may further include power supply switching frequencies, a transmission speed of data, a microcontroller type, timing protocols of the at least one device, and a configuration of the at least one device.

More specifically, the signature template 82 includes the set of parameter frequencies being superimposed onto a frequency spectrum on top of one another so as to define an expected signature 84 of the at least one emission to be detected in physical space. Thus, the signature template 82 includes at least one of single peak characteristics, multiple peak characteristics, harmonically correlated characteristics, non-harmonically correlated characteristics, time correlated characteristics, phase correlated characteristics and duty cycle characteristics. Accordingly, the first means 20 includes at least one of a peak detection algorithm, a multiple peak detection algorithm, a harmonic correlation algorithm, a non-harmonic correlation algorithm, a time correlation algorithm, a phase correlation algorithm, and a duty cycle timing correlation algorithm.

Using the information sent about these devices, components or subcomponents over the network 3, the invention reconstructs the emissions characteristics expected from the at least one device 2. Useful information about the at least one device 2 that can be gathered in cyberspace that directly or indirectly determines the specifications of the device with regards to clocks, processors, power supplies, power converters, oscillators, resonators, integrated circuits is used to reconstruct parts of the unintended emission characteristics. With the emission detection apparatus 20 being so tuned in sensitivity so as to then detect and identify the specific device, the collected emissions are processed and matched to the expected reconstructed emission signature form the parameters transmitted through the network connection 4. Where the information is tied to a specific device, then the specific device can be specifically detected, identified and geolocated.

Since network operations provide information about a device connected to the network in both intended and unintended ways and the information provided can be used to determine physical characteristics, ultimately the network derived information is employed to create template 82 then used in the physical world to physically detect, identify and geolocate a device that is attached to a network based solely on the information gathered about that device on the internet.

The instant invention uses information to identify network users and is further used to indentify characteristics of the at least one device 2 attached to the network 3 in the physical world. The invention generates the signature template 82 of the expected unintended or intended emissions of the actual device for detection in physical three dimensional space by the emissions detection apparatus 20 so as to physically detect, identify and geolocate the device of interest. The key is that the collected information forming the template 82, used to identify the user in physical space, is collected using any network cyberspace data collection or data mining technique.

The signature template 82 may include also data from indirect emission measurement from the at least one device 2 and may be also derived from free field emission data of at least two devices that have been pre-measured. It is also contemplated that only pre-measured emissions data is used to detect the at least one device 2 of interest.

The instant invention also contemplates that template matching algorithm means 28 employs the signature template 82 component of third means 80.

It is important to note here that the at least one device 2 can be connected to the network 3 or was previously connected to the network 3 during the time when the emission collection means 24 is operable to sense emissions.

Optionally the emission detection apparatus 20 may also be employed to collect information about all other devices 5 in the neighborhood of or proximity to the at least one device 2 with resulting information to be fed back into the database 30 so as to categorize the location of the at least one device 2 by address and cross referencing it with other devices 5 detected at that location. This could also be implemented in the reverse, wherein the emissions collection is used to thereafter specifically collect information on the network 3 about the specific device that has been detected in the physical world.

In this embodiment the means 80 would create a signature template 82 for network based algorithms for data expected to be collected via the network.

It would be appreciated that the emission detection apparatus 20 and the network data collection means 60 may be operable so as to provide real time information exchange and positive feedback between one another.

In several embodiments multiple emission detection apparatuses 20 and network data collection apparatuses 60 are networked together to achieve improved results on several devices simultaneously. A set of receivers 24 and electromagnetic sources 42 could be positioned together on one platform or each receiver 24 and each electromagnetic source 42 could be located on separate platforms or any combination thereof and connected to a network data collection apparatus 60 that monitors the network 3. For example, in further reference to FIG. 2, and in one presently preferred embodiment, high sensitivity receivers 24 are positioned in several locations around a manufacturing plant and a network data collection apparatus 60 is installed onto the plant intranet network. This configuration allows the receivers 24 to monitor the situation from a distance sufficient not to disrupt plant operations while the network data collection apparatus 60 collects information from the network. In another embodiment, the emissions detection apparatus 20 is installed around the plant and each system provides fully automated monitoring that provides multiple processors working in parallel to improve performance with each connected directly to the plant intranet network This is particularly beneficial when one of the electronic device 2a, 2b or 2c is degrading and sending out information via the unintended emissions or the network that there is a problem with one or more components of the system. The individual emissions detection apparatus 20 can focus processing assets on identifying the problem from the unintended emissions signature without a need to limit continuous monitoring of other plant assets. In this manner, the emission detection apparatus 20 and the network data collection apparatus 60 work in combination with each other to prevent catastrophic problems on a manufacturing plant floor when one or more systems fail.

In another embodiment, the emissions detection apparatus 20 could be positioned on mobile vehicles, such as ground vehicles, airborne vehicles or even space-borne vehicles to monitor areas of interest to marketing companies, while a network based data collection apparatus 60 may be physically located in a remote location. In the ground vehicle example, a vehicle 32 could drive around specific neighborhoods seeking to detect and geolocate a specific networked user device 2. Once the device 2 is detected and identified, the receiver 24 and emissions signal processing means 26 and algorithm matching means 28 are used to identify other electronic devices 5 contained in the same building where the network connected device 2 is located. In this manner the system 10 can provide enhanced marketing information to marketing organizations who participate in that business. This embodiment further has the ability to store all previously detected devices and device locations in the database 30 such that a database of useable data is achieved. Other users who could benefit from this information other than marketing organizations may also obviously benefit from this embodiment. The database 30 can be stored on-board the emissions detection apparatus or in an alternative embodiment may be stored in another location.

It would be appreciated that first and second means, 20 and 60 respectively, are operable to independently identify operating state of the at least one device 2. However, it is contemplated that the system 10 is configured to correlate measurements between network collected data and free field emission data for detection of the at least one device 2.

Regarding the physical arrangement of the system 10, the first means 20 is positionable in a first location, wherein the at second means 60 is located in a second location, wherein the third means 80 is located in a third location and wherein the first, second and third locations are being independent from each other. Instant invention also contemplated that first, second, and third means, 20, 60 and 80 respectively may be positioned in the same location, with the second means 60 collecting set of parameters in a wireless manner.

Thus, in one embodiment of the invention, the emission detection apparatus 20 includes a receiver 34 configured to detect at least one electronic device 2 by measuring at least one unintended RF emission given off by the at least one electronic device 2 where the template 82 is used as the signature template for the template matching algorithms to identify the device was derived from information collected from the network 3 the at least one device 2 is or was attached to.

In another embodiment, the system 10 may be also configured to verify suppression of an electronic device.

In a further embodiment, the system 10 may be also employed to at least one of detect and neutralize an improvised explosive device (IED), wherein the first means 20 includes is a tunable frequency agile source 42 integrated onto a platform and configured with an to detect emissions from electronic components employed within IED trigger mechanism.

In another embodiment, the emission detection apparatus 20 is used to locate the at least one electronic device 2 that is giving off the at least one unintended RF emission. In another embodiment, at least the emission collection device 24 is positioned on a vehicle 32. In yet another embodiment, at least the emission collection device 24 is positioned in a networked configuration inside a manufacturing facility. In another embodiment, at least the emission collection device 24 is positioned on top of a tower. In still another embodiment, at least the emission collection device 24 is positioned on a vehicle 32 and the emission collection device 24 is in use while the vehicle 32 is in motion. In another embodiment, at least the emission collection device 24 is positioned on an aerial vehicle. In another embodiment, at least the emission collection device 24 is positioned on an object in space. In yet another embodiment at least the emission collection device 24 is positioned on a robot. In still another embodiment at least the emission collection device 24 is positioned on an unmanned vehicle.

In another embodiment at least the emission detection apparatus 20 is positioned on a vehicle. In yet another embodiment, at least the emission detection apparatus 20 is positioned in a networked configuration inside a manufacturing facility. In another embodiment, at least the emission detection apparatus 20 is positioned on top of a tower. In still another embodiment, at least the emission detection apparatus 20 is positioned on a vehicle and the emission detection apparatus 20 is in use while the vehicle is in motion. In another embodiment, at least the emission detection apparatus 20 is positioned on an aerial vehicle. In another embodiment, at least the emission detection apparatus 20 is positioned on an object in space. In yet another embodiment at least the emission detection apparatus 20 is positioned on a robot. In still another embodiment at least the emission detection apparatus 20 is positioned on an unmanned vehicle.

In yet another embodiment, the emission detection apparatus 20 operates in an active automated detection mode and a network detection mode and a passive automated detection mode with correlation between the active automated detection mode and a network detection mode and the passive automated detection mode for detection of at least two targets or devices 2.

In yet another embodiment, the emission detection apparatus 20 is used to detect and identify faulty equipment that is connected to a network 3. In still another embodiment, the emission detection apparatus 20 is used to pinpoint geographically a number of users of an online application. In yet another embodiment, the emission detection apparatus 20 uses a reconstructed signature template 82 that was derived from other means other than network data collection. In yet another embodiment, the emission detection apparatus 20 uses a reconstructed signature template 82 that was derived from means other than network data collection that is combined with network collected data to improve the template 82. In still another embodiment, the emission detection apparatus 20 operates automatically through software for the detection of electronic devices. In yet another embodiment, the emission detection apparatus 20 is used to prevent failure of manufacturing equipment. In still another embodiment, the emission detection apparatus 20 is used to prevent anomalies in any corporate closed network. In yet another embodiment the emission detection apparatus 20 verifies that a device 2 connected to the network 3 is functioning properly. In still another embodiment, the emission detection apparatus 20 is configured as a turnkey system.

In yet another embodiment the invention is a system comprising: a receiver 24, a network based apparatus 60 that collects information about a device using network based means, wherein the receiver 24 is configured to detect at least one electronic device by measuring at least one unintended enhanced emission given off by the at least one electronic device and the template that is used by the emissions collection device is constructed using information collected from the network. In yet another embodiment, the invention is a system 10 comprising: a receiver 24, a network based apparatus 60 that collects information about a device using network based means, an electromagnetic source 42 for enhancing at least one RF emission signature, wherein the receiver 24 is configured to detect at least one electronic device 2 by measuring at least one unintended enhanced RF emission given off by the at least one electronic device 2 and enhanced by the electromagnetic source 42, a template 82 used by the emissions detection apparatus 20 that is constructed using information collected from the network 3. In still another embodiment, the network data collection apparatus 60 employed to collect the network data is software based. In still another embodiment, the network data collection apparatus 60 employed to collect the network data is hardware based. In yet still another embodiment, the network data collection apparatus 60 is digital fingerprinting. In still another embodiment the network data collection apparatus 60 is deep packet inspection 66. In another embodiment, the network data collection apparatus 60 is a program that resides on the device that is connected to the network 3 that sends information about the device to be located to another program located elsewhere on the network 3. In yet another embodiment, a network of at least two emission collection devices 24 is used to enhance collection of the at least one device 2 that is connected to the network 3. In yet another embodiment, a network of at least two emissions collection devices 24 and at least two emissions signal processors 26 are used to enhance the collection of at least one device 2 where each pair of emission collection devices 24 and emissions signal processors are connected to at least one of a different algorithm or multiple algorithms that form a parallel in an array of algorithms 57. In still another embodiment, at least two emission detection apparatus 20 are networked together and are positioned in a manner that the device 2 of interest can be monitored and the emission measurement detection apparatus 20 is also connected to the network 3. In yet another embodiment, at least two emission detection apparatus 20 are networked together and are positioned on at least one of a vehicle, an architectural structure, or any combination thereof to identify the device of interest. In still another embodiment, the emission detection apparatus 20 is used to detect devices that at one time were connected to a network 3 inside a building. In yet another embodiment, the emission detection apparatus 20 is used to detect a component in a factory. In still another embodiment, the emission detection apparatus 20 is used to create a database of targets found and the location of targets found. In still another embodiment, emission detection apparatus 20 provides a mechanism for storing at least one signature of targets of interest. In yet still another embodiment, the emission detection apparatus 20 is used in a network to achieve the ability to detect electronics over a broad geographical range. In yet another embodiment, the emission detection apparatus 20 provides a database of data collected to make it useful for marketing purposes. In still another embodiment emission detection apparatus 20 operates automatically through software for the detection of electronic devices. In yet another embodiment, the emission detection apparatus 20 uses one of a detection template constructed of information collected on a network 3 and information collected by direct inspection of the electronic device. In yet another embodiment, the emission measurement device both a detection template constructed of information collected on a network and information collected by direct inspection of the electronic device to derive an improved template that is used to detect electronic devices. In still another embodiment, the emission detection apparatus 20 is used to predict the failure characteristics of the device that is attached to the network 3. In yet another embodiment, the electromagnetic source 42 is employed to compliment a passive emissions detection system that uses network derived data for signature or templates that are matched to the emissions collected. In yet another embodiment, the emission detection apparatus 20 verifies information already accessed via network collection. In still another embodiment, the system 10 uses multiple orthogonal algorithms to detect and identify the target of interest. In yet another embodiment, the system 10 creates the signature based on input from the network data mining such as clock speeds, font, screen size, processor speed, web browsing information, power supply switching speeds and other data collected via the network about the networked device.

In one application, the invention is employed to determine the health of the electronics that are connected to the network based on the information collected. For example, if a certain device 2 is expected to be sending predetermined information over the network 3 and is instead sending a faulty (deviating from such predetermined) information, such faulty device 2 is detected, located. Further diagnostics can be completed on such device 2 so as to assure proper functioning and operation thereof.

Further, the invention can be used with an active illumination means 42 as a stimulus of electromagnetic signatures that unintentionally emit from electronics to stimulate the device 2 that is trying to be found. The network collection component of the invention can measure real-time the changes to the cyber collected data to verify that the electronic device being physically stimulated is in fact the device that is connected to the network that is of interest. The active Advanced Electromagnetic Location of Electronic Devices (AELED) system is a complete system comprised of sensitive passive detection and active illumination that can be used as a subcomponent of the invention.

Emission signatures also provide valuable information regarding the potential susceptibility and vulnerability of the systems to electromagnetic (EM) energy at those frequencies. For instance if the at least one device 2 that is connected to the network 3 is a mobile device that is sending erroneous data at the same time that another device 2 that is connected to the network 3 is in operation in the near vicinity of the mobile device 2, the invention is used to physically locate the mobile device 2 in the plant and the non-mobile device. By measuring the emission characteristics of both devices, the invention may be used as an Electromagnetic Interference (EMI) mitigation tool.

The introduction of EM field strengths at select frequencies where the device is measured to be emitting, suitable to cause failure, degradation or temporary disruption may amplify and/or alter the unintentional radiation characteristics of the device. The characteristic signatures of a specific device may be easier to pick out of the noise. The signature changes might be leveraged in numerous ways. By combining information collected from the network this capability can be improved dramatically.

The introduction of EM field strengths at select frequencies may amplify and/or alter the unintentional radiation characteristics of the device. Damaged semiconductors, determined by breakdown characteristics, for instance may radiate robustly and be able to be identified readily via as a degrading part in a critical device that is connected to the network. The characteristic signatures of a specific device may be easier to pick out of the noise using these techniques. The signature changes might be leveraged in numerous ways. One advantage of the instant invention includes amplification of the emission signature to improve the ability to detect, identify and track the emitter.

The field strengths necessary to cause the described responses may not have to be so robust. Lower field strengths in some cases may alter circuit function substantially. For example, oscillator instabilities at low field strengths can significantly alter the emission signature of such devices.

Figure 5:
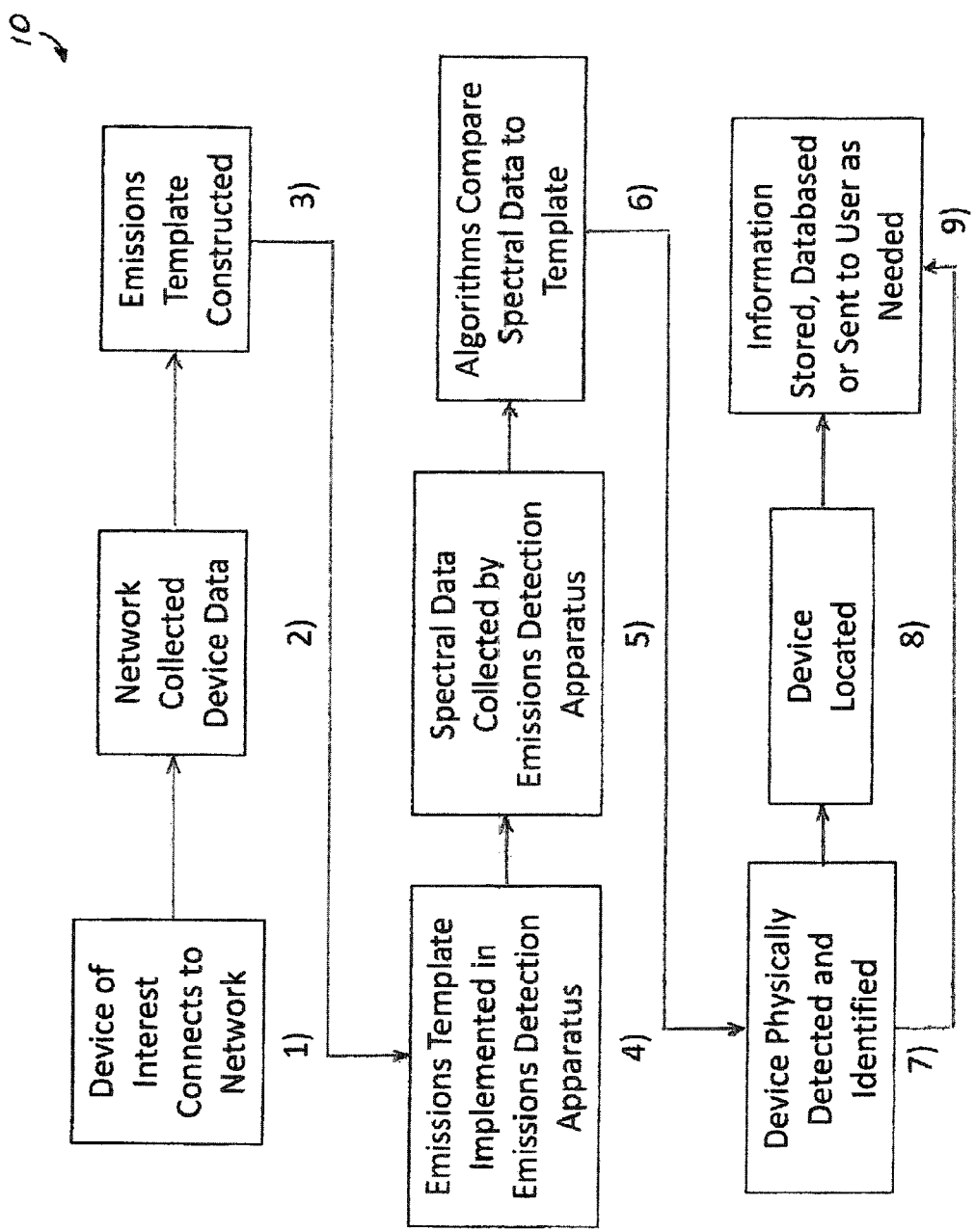
FIG. 5 is a flow chart of the method for at least one of detecting, identifying, diagnosing anomalies in and geolocating at least one device connectable to a network.

Now in reference to FIG. 5, the method of at least one of detecting, identifying, diagnosing and geolocating at least the device 2 connected or connectable to a network 3 includes the step of providing an emission detection apparatus 20. Then, providing means 60 for collecting information or data transmitted by the at least one device 2 connected or connectable to a network 3. Next, collecting, by the network data collection means 60, information transmitted from the at least one device 2. Generating, based on the collected information, a signature template 82 of the at least one device 2. Next, sensing, with the emission detection apparatus 20, emission radiated from the at least one device 2. Then, processing the sensed radiated emission in accordance with at least one predetermined algorithm. Next, comparing the processed radiated emission with the generated signature template. And, finally, at least one of detecting, identifying, diagnosing and geolocating the at least the device 2.

Now in reference to FIG. 6, the method of at least one of detecting, identifying, diagnosing and geolocating at least the device 2 connected or connectable to a network 3 in an alternative form provides for generation of the signature template 82 without the use of the network data collection means 60. For example, such signature template 82 may be generated by the manufacturer of the device 2 and stored within the data storage 30 of the emission detection apparatus 20. Although, it is also contemplated that such signature template 82 has been stored within the storage 30 of the emissions detection apparatus 20.

The information regarding the physical location of a specific device that is connected to the network 3 can be used for marketing purposes and for physically locating a user whom the network data collection means 60 and the third means 80 identified as having certain habits online. For example, marketing information is enhanced when the online users shopping habits can be identified and the physical location of the user's networked electronic device can be physically located. For marketing purposes it may be useful to identify the physical location of the user in a certain neighborhood or on a specific street in a certain neighborhood. This information can be fed back into cyberspace to identify user's online habits. The invention can further be used to not only identify a specific device 2 that is connected to a network 3, but then using a database of household items identify the specific device 2 and location of the device of interest as well as other electronic devices owned by the same owner of the device that 2 is connected or connectable to the network 3. In this way, a certain user may in using the network 3 yield information about his/her specific computer, mobile computing device or any networked device and once that device has been detected, identified and geolocated the electronic devices that are in the users household may be identified. For example, knowing the make and model of the television of the online user as well as his stereo, coffee maker, automobile, DVD player, video game, mobile telephone as well as his spouses items and any other items that may provide information regarding his age, demographics, children, children's ages may provide significant marketing information to companies that seek to sell products online or using traditional offline techniques such as direct mailings or other targeted marketing techniques.

In geographical regions where background emissions are minimized, such as rural or mountainous areas by a lack of electronics among a less dense population, the invention may be used to locate users of a network for targeted marketing for products specific to less rural users.

In tight packed cities the identification of specific demographics within the obvious larger scale demographics collected by other techniques may prove extremely valuable to certain targeted marketing organizations.

Thus, the method of marketing includes the step of providing an emission detection apparatus 20. Then, providing means 60, such as network data collection apparatus, for collecting information transmitted by the at least one device 2 connected or connectable to a network 3. Next, collecting, by the information collecting means 60, information transmitted from the at least one device 2. Then, sensing, with the emission detection apparatus 20, emission radiated from the at least one other device 5 located in a proximity to the at least one device 2. Identifying the at least one other device 5. And, finally, streaming to the at least one device 2 an information preselected based on identification of the at least one other device 5. The method of marketing may include additional step of storing all collected information to a database.

For marketing purposes, the receivers 24 could be positioned on mobile vehicles 32, such as ground vehicles, airborne vehicles or even space-borne vehicles to monitor areas of interest to marketing companies, while a network based data collection apparatus 60 can be physically located in a remote stationary location. In the ground vehicle example, a vehicle 32 could drive around specific neighborhoods seeking to detect and geolocate a specific online user device whose signature template 82 has been generated by the network data collection apparatus 60. Once the device is detected and identified, the receiver 24 and analysis capability can be used to identify other electronics contained in the same building where the network connected device is located. In this manner the system can provide enhanced marketing information to marketing organizations who participate in that business. This embodiment further has the ability to store all previously detected devices and device locations such that a database of useable data is achieved. Other users who could benefit from this information, other than marketing organizations, may also obviously benefit from this embodiment. It would be appreciated that the receiver 24 is configured to sense emissions through at least one wall of the building that the device 2 is located in.

The information regarding the physical location of a specific device 2 that is connected to the network 3 may be also employed to detect, identify and geolocate unauthorized users of the network. By identifying an unauthorized user by a mechanism via network captured data, the data about the unauthorized user can be used to form the template 82 that can be used by the invention to detect, identify and geolocate the unauthorized user on the network. For example, an unauthorized user of a network 3 of the wireless type must send information about the device 2 that is connected to the network 3 in order to access the wireless system and then further send information about himself/herself, as the user accesses different other sites, devices etc, on a broader network. The collection of the transmitted information provides significant information about the unauthorized user that can be used to create the template 82 of the signature of the unauthorized device. The most straightforward approach to identify the unauthorized user is by the transmissions that the user is sending off, but since all users may be wirelessly connecting to the network 3 using the same frequency and protocols it may be difficult to find the user using the intended emissions only. However, by using the template 82 constructed so as to describe both the intended and unintended emissions the unauthorized user is emitting and further employing the emission collection device 24 either in a passive or active mode, the user can be physically located by the above described embodiments.

The above described embodiments are also advantageous in detecting at least one of illegal activity and illegal device in accordance with a method including the step of providing an emission detection apparatus. Then, providing means 60 for collecting information transmitted by a device connected or connectable to a network. Next, collecting, by the network data collection apparatus 60, information transmitted from the device. Generating a signature template of the device based on the collected information. Next, sensing, with the emission detection apparatus 20, emissions radiated from the at least one device 2 or at least one other device 5 located in proximity to the at least one device 2. Then, matching signature of sensed emissions with the generated signature template. Finally, geolocating, with the emission sensing apparatus at least one of the device and the at least one other device 5.

By way of one example, the at least one device 2 may be a counterfeited electronic component or a counterfeited electronic device. By way of another example, the system 10 can detect network transmissions related to counterfeited currency activities and the emission collection device 24 can be configured to detect odor of the ink normally used to print counterfeited currency and/or intended or unintended electromagnetic emissions from the apparatus employed in printing counterfeited currency.

By way of another example, the system 10 can be employed at airports, train stations, marine port facilities, bus stations, court houses, and any other dwellings that incorporate stations for screening humans and/or goods so that spectral emission characteristics collected from the devices, equipment or goods undergoing screening are correlated with the data and/or information characteristics collected over the network in order to identify a user of the devices, equipment or good. In a more specific example, if the network collection apparatus 60 generates the corresponding signature template 82 of a specific mobile phone transmitting information over the network connection 4, the emission detection apparatus 20 positioned at the screening station and having such signature template 82 stored therewithin will be operable to immediately identify the user of such mobile phone of interest.

It would be appreciated that this invention seeks to merge cyberspace online data collection with the ability to detect very weak emissions characteristics of electronic devices that can define the user of the invention the location of a specific device whose information was collected about online. It has been demonstrated that there are significant advantages to the analysis of both intended and unintended emissions from electronic devices to garner information about the emitting equipment, the information processed by the equipment and the location of the equipment. All devices that allow a network user to access the network 3 utilize the electronic device 2 as a mechanism to interface with the network 3.

Although the present invention has been shown in terms of the detection, identification and geolocation of the electronic device, it will be apparent to those skilled in the art, that the present invention may be applied to detection, identification and geolocation of other devices or locations emitting odor or smell or sound.

In one example, emission detection apparatus 20 may be configured to detect physical location emitting a specific odor or smell. In a more particular example, each narcotic substance is characterized by a specific odor or smell. Thus, it is relatively easy and practical to generate a library of odors or smells of interest as a plurality of emission templates 82 or as a plurality of signatures within one template 82. When emission of a specific odor or smell of interest is detected, additional emission detection apparatus 20 may be employed for detecting and identifying any electronic device located in a proximity to the location emitting this odor or smell. Then, the constructed emission signature may be employed by the network data collection means 60 for collecting any information transmitted over the network connection 4. And finally, a plurality of emission collection means 24 or a plurality of emission detection apparatuses 20 may be employed to geolocate exact coordinates of the location.

In another example, odor detecting apparatus may be positioned in a key location at a chemical or nuclear processing facility as a verification of proper operation transmitted by various sensors usually employed in such facilities. At the same time emission collection means 24 or emission detection apparatuses 20 configured to sense electromagnetic energy can be employed for verifying proper operation of the sensors themselves.

In similar applications, the instant invention may be employed for detecting, geolocating and verifying emission of a sound. For example, proper operation of an audible alarm may be monitored by the instant invention.

Furthermore, the template 82 may be constructed from data characteristics collected by the emission collection 24 and processed by the emission signal processing means 26. In this embodiment, the second means 60 would be configured to employ template matching means 28 so as to compare the characteristics of the parameters transmitted through the network connection 4.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. An emissions detection apparatus for at least one of detecting, identifying, diagnosing and geolocating an electronic device or an information transmitted from the electronic device, said emissions detection apparatus comprising:
   (a) an emissions collections device connected to an antenna receiving emission of an electromagnetic energy emitted from the electronic device, said emissions collections device collects a spectral data emitted from the electronic device and received at the antenna;
   (b) one or more algorithms processing said collected spectral data, said one or more algorithms selected from a group consisting of a peak detection algorithm, a multiple peak detection algorithm, a harmonic correlation algorithm, a non-harmonic correlation algorithm, a time correlation algorithm, a phase correlation algorithm, and a duty cycle timing correlation algorithm; and
   (c) one or more algorithms matching said processed spectral data to an emissions template, wherein a match of said processed spectral data with the emissions template at least one of detects, identifies, diagnoses and geolocates the electronic device or the information transmitted from the electronic device.

2. The emissions detection apparatus of claim 1, wherein said processed spectral data includes a processed emission signal and wherein the emissions template includes at least one emission signature.

3. The emissions detection apparatus of claim 2, wherein said emissions template is constructed from information collected from a network.

4. The emissions detection apparatus of claim 1, wherein said one or more algorithms matching said processed spectral data to the emissions template includes at least one of:
   (a) a baseband demodulation;
   (b) decimation;
   (c) filtering;
   (d) Fourier Transforms;
   (e) Wavelet Transforms;
   (f) Artificial Intelligence (AI);
   (g) Artificial Neural Networks (ANN);
   (h) detection and signal identification algorithms;
   (i) reconfigurable hardware (FPGA) topologies;
   (j) a Laplace transform; and
   (k) a convolution technique.

5. The emissions detection apparatus of claim 1, further comprising the emissions template, wherein the emissions template includes at least one of:
   (a) single peak characteristics;
   (b) multiple peak characteristics;
   (c) harmonically correlated characteristics;
   (d) non-harmonically correlated characteristics;
   (e) time correlated characteristics;
   (f) phase correlated characteristics; and
   (g) duty cycle characteristics.

6. The emissions detection apparatus of claim 1, wherein the electronic device is connected or being previously connected to a network, wherein the electronic device transmits or previously transmitted a set of parameters through the network, and wherein said set of parameters includes at least one of:
   (a) a clock;
   (b) a processor type;
   (c) a transmission frequency;
   (d) power supply switching frequencies;
   (e) a transmission speed of data; and
   (f) a microcontroller type.

7. The emissions detection apparatus of claim 1, wherein the electronic device is connected or being previously connected to a network, wherein the electronic device transmits or previously transmitted a set of parameters through the network, and wherein said set of parameters includes at least one of:
   (a) an Internet Protocol (IP) address;
   (b) connection speeds;
   (c) modem speeds;
   (d) fonts;
   (e) clock speeds;
   (f) processor speeds;
   (g) a hardware configuration;
   (h) a software configuration;
   (i) passwords; and
   (j) a web browsing information.

8. The emissions detection apparatus of claim 1, wherein the electronic device includes at least one electronic component giving off intended or unintended emissions, said at least one component is selected from a group consisting of clocks, processors, microcontrollers, power supplies, power converters, oscillators, resonators and integrated circuits.

9. The emissions detection apparatus of claim 1, wherein the electronic device is connected or was previously connected to a network and wherein said emissions detection apparatus predicts, detects or prevents anomalies in the network and/or monitors status of the network.

10. The emissions detection apparatus of claim 1, wherein said emissions detection apparatus predicts health of the electronic device and/or a component thereof.

11. The emissions detection apparatus of claim 1, wherein the electronic device is a faulty device or a device that transmits a faulty information.

12. The emissions detection apparatus of claim 1, wherein the electronic device is a counterfeited electronic device and wherein said emissions detection apparatus at least one of detects, identifies, diagnoses and geolocates the counterfeited electronic device.

13. The emissions detection apparatus of claim 1, wherein said emissions detection apparatus is configured to detect configurations of the electronic device.

14. The emissions detection apparatus of claim 1, wherein said emissions detection apparatus is configured to detect configurations of the electronic device and/or verify that the electronic device connected to a network is functioning properly.

15. The emissions detection apparatus of claim 1, wherein said emissions detection apparatus is configured to at least one of detect faulty information and diagnose problems with electronic parts that are part of circuits contained in sub-components of the electronic device connected or connectable to a network.

16. An emissions detection apparatus for at least one of detecting, identifying, diagnosing and geolocating an electronic device or an information transmitted from the electronic device, said emissions detection apparatus comprising:
   (a) an emissions collections device connected to an antenna receiving an emission of an electromagnetic energy emitted from the electronic device, said emissions collections device collects a spectral data emitted from the electronic device and received at the antenna, said emission collection device including at least a low noise amplifier and a tuner;
(b) one or more algorithms processing said collected spectral data, said one or more algorithms selected from a group consisting of a peak detection algorithm, a multiple peak detection algorithm, a harmonic correlation algorithm, a non-harmonic correlation algorithm, a time correlation algorithm, a phase correlation algorithm, and a duty cycle timing correlation algorithm; and
(c) one or more algorithms matching said processed spectral data to an emissions template, wherein a match of said processed spectral data with the emissions template at least one of detects, identifies, diagnoses and geolocates the electronic device or the information transmitted from the electronic device.

17. The emissions detection apparatus of claim 16, wherein the emissions template includes a set of parameters collected from a network and superimposed onto a frequency spectrum, said set of parameters defining an expected emission signature of the emission of the electromagnetic energy.

18. A method for at least one of detecting, identifying, diagnosing and geolocating an electronic device, said method comprising the steps of:
(a) collecting at least one emission radiated from said electronic device;
(b) processing, in a frequency and time domains with at least one of a peak detection algorithm, a multiple peak detection algorithm, a harmonic correlation algorithm, a non harmonic correlation algorithm, a time correlation algorithm, a phase correlation algorithm, and a duty cycle timing correlation algorithm, said radiated emission to extract a signature of said electronic device;
(c) matching said signature of said radiated emission with an emissions template; and
(d) at least one of detecting, identifying, diagnosing and geolocating said electronic device based on a match of said signature with said emissions template.

19. The method of claim 18, further comprising the step of constructing said emissions template from a set or parameters transmitted by said electronic device through a network.

20. The method of claim 19, further comprising the step of superimposing said set of parameters collected from said network onto a frequency spectrum of said radiated emission, said set of parameters defining an expected signature of said radiated emission.

21. The method of claim 18, further comprising the step of constructing said emissions template from information collected in a cyberspace.

22. The emissions detection apparatus of claim 1, wherein said emissions collections device is a receiver comprising a low noise amplifier, a tuner and an analog-to-digital converter.

* * * * *